United States Patent
Shammoh

(10) Patent No.: US 9,815,549 B1
(45) Date of Patent: Nov. 14, 2017

(54) EMERGENCY LANDING GEAR ACTUATOR FOR AIRCRAFT

(71) Applicant: Ali A. A. J. Shammoh, Safat (KW)

(72) Inventor: Ali A. A. J. Shammoh, Safat (KW)

( * ) Notice: Subject to any disclaimer, the term of this patent is extended or adjusted under 35 U.S.C. 154(b) by 0 days.

(21) Appl. No.: 15/586,224

(22) Filed: May 3, 2017

(51) Int. Cl.
| | | |
|---|---|---|
| B64C 25/30 | (2006.01) | |
| B64C 25/34 | (2006.01) | |
| B64C 25/22 | (2006.01) | |
| B64C 25/12 | (2006.01) | |
| B64C 25/60 | (2006.01) | |
| F15B 15/10 | (2006.01) | |

(52) U.S. Cl.
CPC .............. *B64C 25/30* (2013.01); *B64C 25/12* (2013.01); *B64C 25/22* (2013.01); *B64C 25/34* (2013.01); *B64C 25/60* (2013.01); *F15B 15/10* (2013.01); *B64D 2201/00* (2013.01)

(58) Field of Classification Search
CPC ......... B64C 25/12; B64C 25/22; B64C 25/30; B64C 25/56; B64C 25/60; B64C 2025/125; B64D 2201/00
See application file for complete search history.

(56) References Cited

U.S. PATENT DOCUMENTS

| | | | |
|---|---|---|---|
| 1,853,232 A | | 4/1932 | Schwarz |
| 2,474,694 A | * | 6/1949 | Saulnier .................. B64C 25/12 244/102 R |
| 2,519,522 A | | 8/1950 | Wells |
| 2,974,912 A | * | 3/1961 | Namsick .................. B64D 1/14 188/266 |
| 3,173,630 A | | 3/1965 | Milana |
| 3,693,914 A | | 9/1972 | May |
| 9,248,905 B2 | * | 2/2016 | Gerard .................... B64C 25/16 |
| 2011/0272523 A1 | | 11/2011 | Uegaki |
| 2013/0228649 A1 | | 9/2013 | Frank |
| 2014/0061368 A1 | | 3/2014 | Karim |
| 2014/0319265 A1 | * | 10/2014 | Cacciaguerra .......... B64C 25/56 244/6 |

FOREIGN PATENT DOCUMENTS

DE          28 26 619 A          12/1979

* cited by examiner

*Primary Examiner* — Richard R Green
(74) *Attorney, Agent, or Firm* — Richard C. Litman

(57) ABSTRACT

The emergency landing gear actuator for aircraft utilizes a pair of airbags for rapid emergency deployment of landing gear when the conventional hydraulic actuator fails. In the retracted position, the at least one wheel of the landing gear is stored in a first cavity formed in the lower portion of the wing. The shock strut and the side strut are stored in an adjacent second cavity formed in the lower portion of the wing. First and second airbags are respectively mounted in the first and second cavities. The first airbag and the second airbag are each selectively inflatable for emergency deployment of the at least one wheel, the shock strut and the side strut. When the hydraulic actuator fails to deploy the landing gear, the first and second airbags are inflated, forcing the shock strut to rotate and position the at least one wheel in its deployed position.

10 Claims, 4 Drawing Sheets

EMERGENCY LANDING GEAR ACTUATOR FOR AIRCRAFT

BACKGROUND OF THE INVENTION

1. Field of the Invention

The present invention relates generally to aircraft landing gear, and particularly to an airbag-based actuator for rapid emergency deployment of an aircraft's landing gear.

2. Description of the Related Art

FIG. 2 illustrates a conventional hydraulic landing gear system 100. The landing gear is deployed and retracted by selective actuation of a hydraulic piston 122, mounted in wing 124. Actuation of hydraulic piston 122 causes selective rotation and extension of side strut 118 which, in turn, causes shock strut 114 to rotate about pivot 128 and, thereby, deploy the landing gear 100. When retracted, wheel 116 is received within cavity 112, formed in the lower surface 126 of wing 124, and side strut 118 and shock strut 114 are similarly contained in an adjacent cavity 120.

Numerous issues may affect proper deployment of the landing gear 100, from basic mechanical failure of any of the parts involved to a leakage of hydraulic fluid. Unfortunately, in a conventional hydraulic landing gear system, such as system 100, if there is either a mechanical or hydraulic issue which prevents proper deployment, there are very few options for alternative deployment of the landing gear when the aircraft is in flight. Thus, an emergency landing gear actuator for aircraft addressing the aforementioned problems is desired.

SUMMARY OF THE INVENTION

The emergency landing gear actuator for aircraft utilizes a pair of airbags for rapid emergency deployment of an aircraft's landing gear when the conventional hydraulic actuator fails. Similar to a conventional landing gear system, first and second adjacent cavities are formed in a lower surface of a wing of the aircraft. A hydraulic piston is mounted within the wing of the aircraft for conventional actuation of the landing gear. A first end of a shock strut is pivotally secured to the wing. At least one wheel is rotatably secured to a second, opposed end of the shock strut. A first end of a side strut is mechanically linked to the hydraulic piston and a second end thereof is pivotally secured to a central portion of the shock strut.

Similar to conventional aircraft landing gear, selective actuation of the hydraulic piston selectively rotates and extends the side strut. The rotation and extension of the side strut causes the shock strut to rotate about the first end thereof, thus positioning the at least one wheel in its deployed landing position. The wheel is removably received in the first cavity and the side strut and the shock strut are each removably received in the second cavity when in the retracted position. However, a first airbag is mounted in the first cavity formed in the lower surface of the wing of the aircraft, and a second airbag is mounted in the second cavity formed in the lower surface of the wing of the aircraft. The first airbag and the second airbag are each selectively inflatable for emergency deployment of the at least one wheel, the shock strut and the side strut. Thus, when the hydraulic actuator fails to deploy the landing gear, the first and second airbags are rapidly inflated, forcing the shock strut to rotate downwardly and position the at least one wheel in its downward, deployed position beneath the wing.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
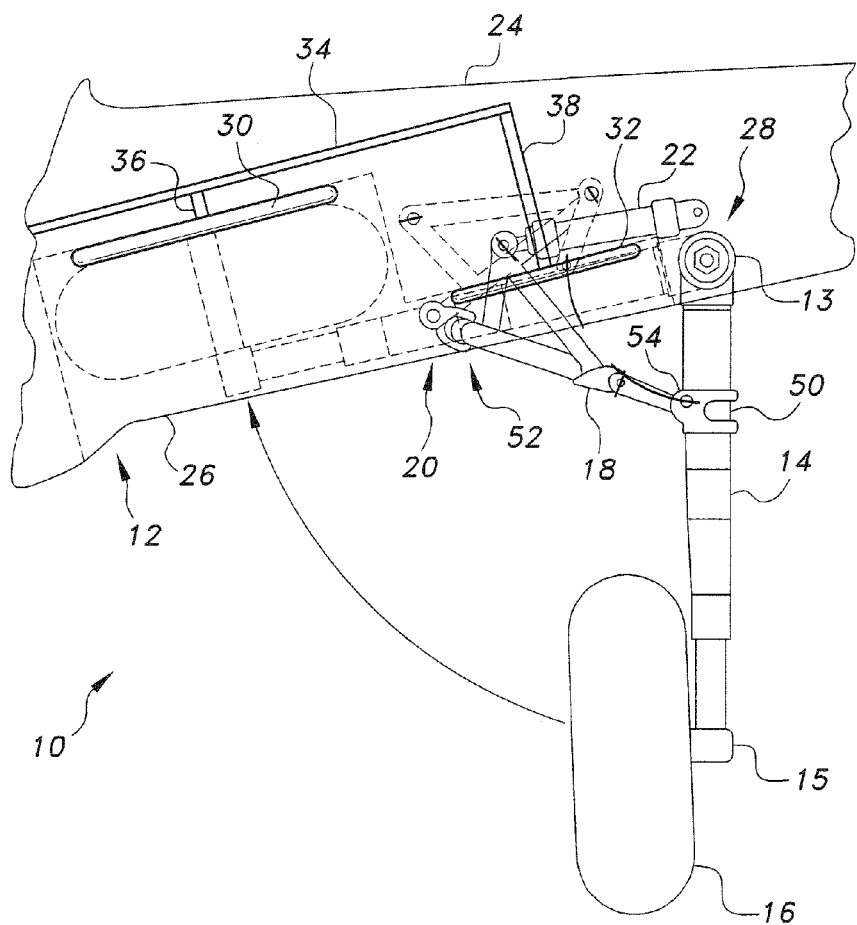
FIG. 1 diagrammatically illustrates an emergency landing gear actuator for aircraft according to the present invention.
Figure 2:
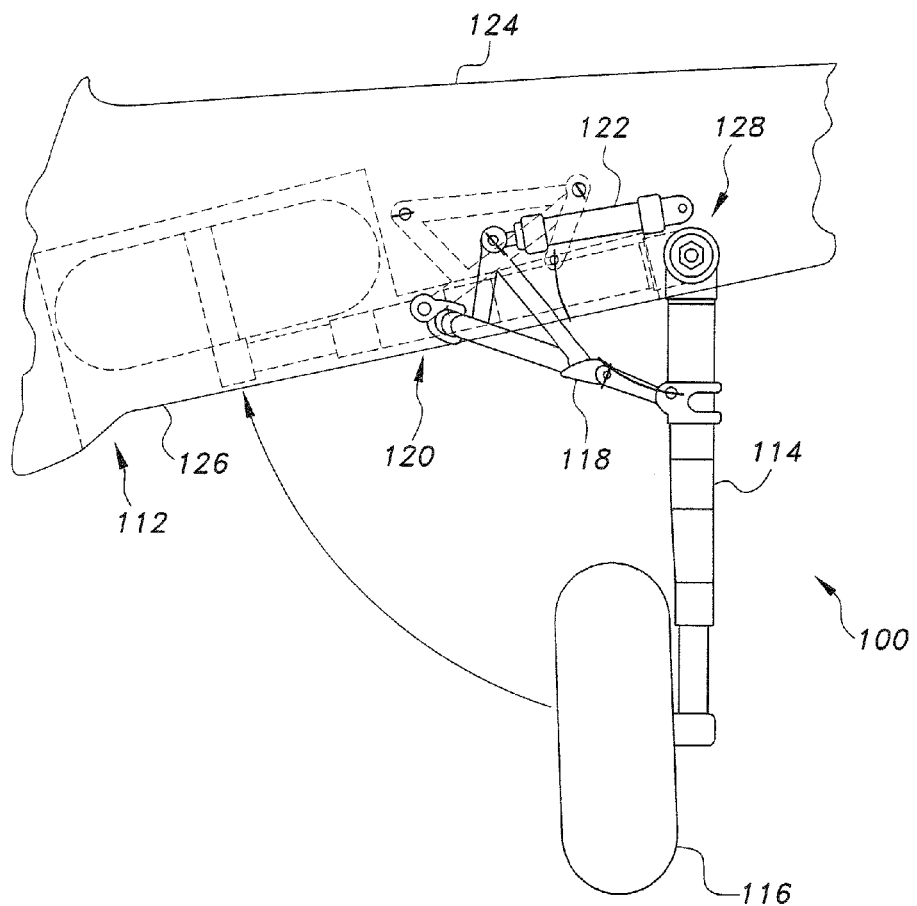
FIG. 2 diagrammatically illustrates a conventional prior art hydraulic landing gear system.
Figure 3:
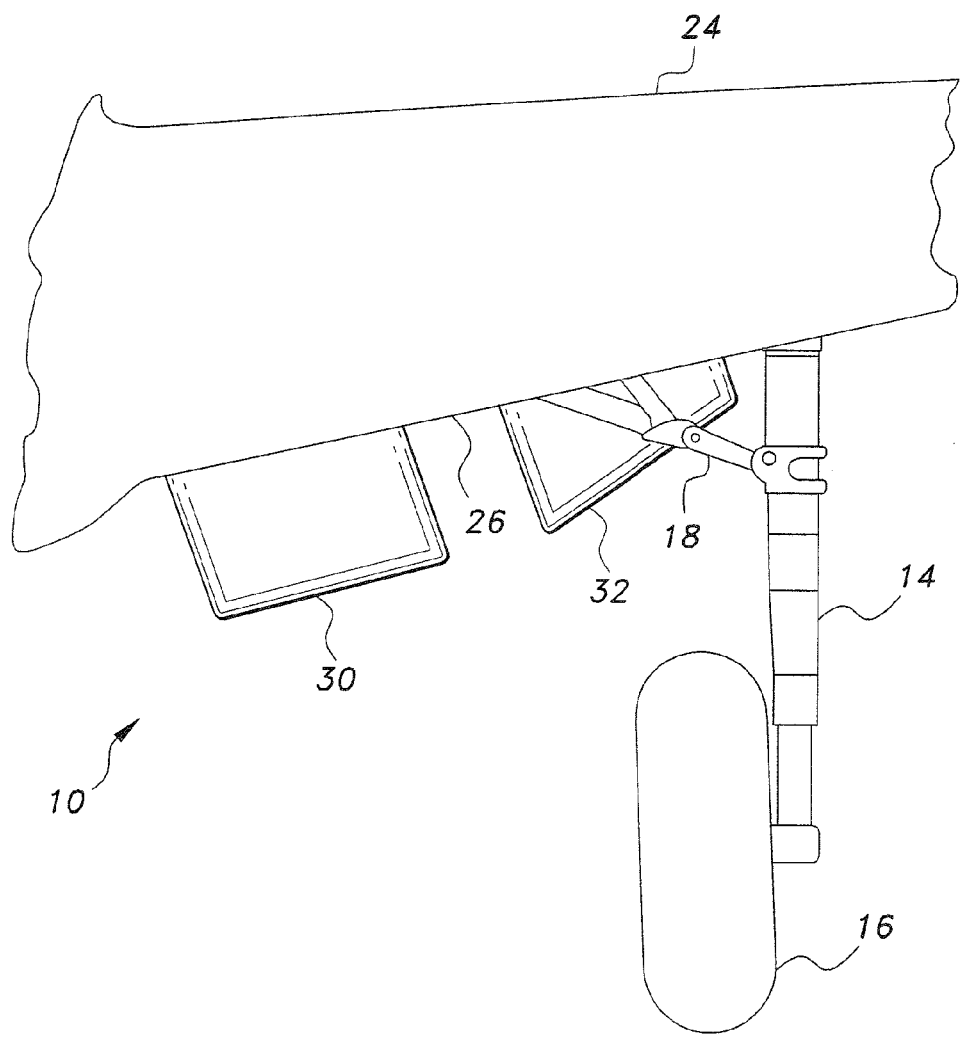
FIG. 3 is a rear view of the emergency landing gear actuator for aircraft in a deployed configuration.

As best shown in FIGS. 1 and 3, the emergency landing gear actuator for aircraft 10 utilizes a pair of airbags 30, 32 for rapid emergency deployment of an aircraft's landing gear when the conventional hydraulic actuator fails. Similar to a conventional landing gear system, such as system 100 of FIG. 2, first and second adjacent cavities 12, 20, respectively, are formed in a lower surface 26 of a wing 24 of the aircraft. It should be understood that wing 24 is shown for exemplary purposes only. A hydraulic piston 22 is mounted within the wing 24 for conventional actuation of the landing gear. A first end 13 of a shock strut 14 is pivotally secured to the wing 24 at 28. At least one wheel 16 is rotatably secured to a second, opposed end 15 of the shock strut 14. A first end 52 of a side strut 18 is mechanically linked to the hydraulic piston 22, and a second end 54 thereof is pivotally secured to a central portion 50 of the shock strut 14. FIG. 1, similar to the prior art system 100 of FIG. 2, makes use of a conventional hydraulic aircraft landing gear mechanism. It should be understood that the present emergency landing gear actuator for aircraft 10, which makes use of a pair of airbags 30, 32 (as will be described in greater detail below), may be applied to any desired type of aircraft using any suitable type of deployable landing gear.

Similar to conventional aircraft landing gear, selective actuation of the hydraulic piston 22 selectively rotates and extends the side strut 18. The rotation and extension of the side strut 18 causes the shock strut 14 to rotate about its first end 13, via pivot 28, thus positioning the at least one wheel 16 in its deployed landing position. The wheel 16 is removably received in the first cavity 12 and the side strut 18 and the shock strut 14 are each removably received in the second cavity 20 when in the retracted position.

First airbag 30 is mounted in the first cavity 12, formed in the lower surface 26 of the wing 24, and second airbag 32 is mounted in the second, adjacent cavity 20. As shown in FIG. 3, the first airbag 30 and the second airbag 32 are each selectively inflatable for emergency deployment of the at least one wheel 16, the shock strut 14 and the side strut 18. Thus, when the hydraulic actuator fails to properly deploy the landing gear, the first and second airbags 30, 32 are rapidly inflated, forcing the shock strut 14 to rotate downwardly and position the at least one wheel 16 in its downward, deployed position beneath the wing 24.

Figure 4:
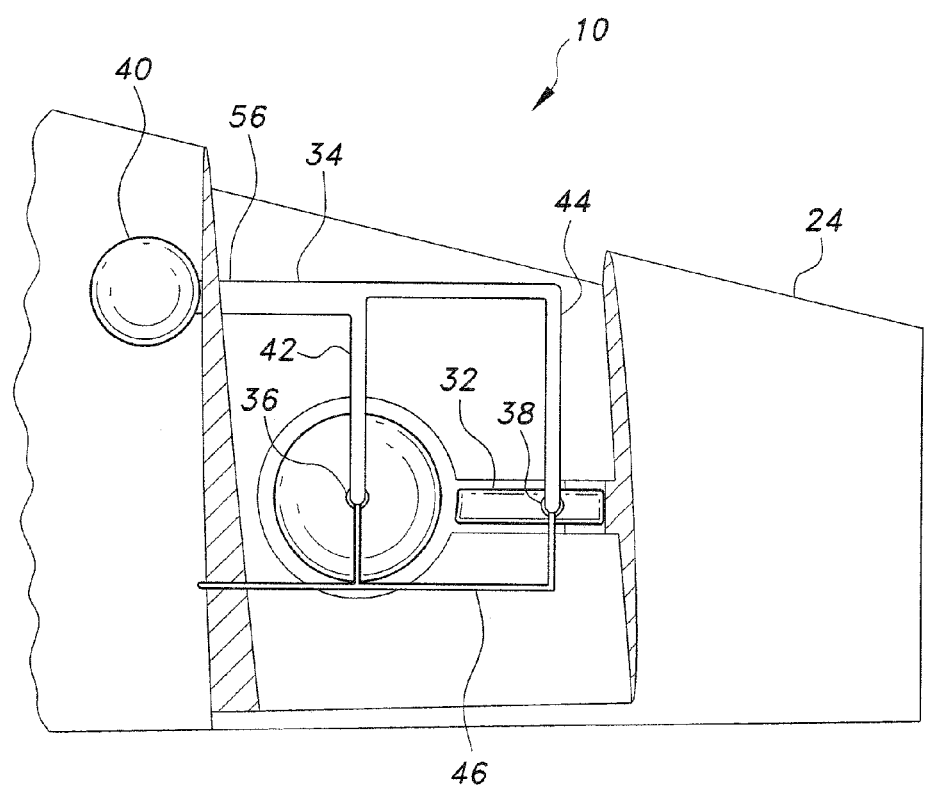
FIG. 4 is a partial, cut-away top view of the emergency landing gear actuator for aircraft according to the present invention.

As shown in FIGS. 1 and 4, a source of pressurized air 40, such as an air tank or the like, is mounted in wing 24. A first end 56 of conduit 34 is connected to the air tank 40. The second, opposite end of conduit 34 is branched, with first branch 42 being connected to first airbag 30 and second branch 44 being connected to second airbag 32. Preferably, first check valve 36 controls air flow into first airbag 30 and second check valve 38 controls air flow into second airbag 32. First and second check valves 36, 38 may be selectively controlled by a remote actuator (via control line 46), preferably located in the cockpit of the aircraft.

It is to be understood that the present invention is not limited to the embodiments described above, but encompasses any and all embodiments within the scope of the following claims.

I claim:

1. An emergency landing gear actuator for aircraft, comprising:
    a hydraulic piston adapted for mounting within a wing of an aircraft;
    a shock strut having opposed first and second ends, the first end thereof being pivotally secured to the wing of the aircraft;
    at least one wheel rotatably secured to the second end of the shock strut;
    a side strut having opposed first and second ends, the first end thereof being mechanically linked to the hydraulic piston, the second end thereof being pivotally secured to a central portion of the shock strut;
    a first airbag adapted for mounting in a first cavity formed in a lower surface of the wing of the aircraft; and
    a second airbag adapted for mounting in a second cavity formed in the lower surface of the wing of the aircraft,
    whereby selective actuation of the hydraulic piston selectively rotates and extends the side strut, the rotation and extension of the side strut causing the shock strut to rotate about the first end thereof, positioning the at least one wheel in a deployed landing position, the wheel being adapted for removable reception in the first cavity and the side strut and the shock strut being adapted for removable reception in the second cavity when in a retracted position, the first airbag and the second airbag each being selectively inflatable for emergency deployment of the at least one wheel, the shock strut and the side strut.

2. The emergency landing gear actuator for aircraft as recited in claim 1, further comprising a source of pressurized air in fluid communication with the first and second airbags.

3. The emergency landing gear actuator for aircraft as recited in claim 2, wherein the source of pressurized air comprises an air tank mounted in the wing of the aircraft.

4. The emergency landing gear actuator for aircraft as recited in claim 3, further comprising a conduit having a first end and a second branched end, the first end being connected to the air tank, a first branch of the second branched end being connected to the first airbag, and a second branch of the second branched end being connected to the second airbag.

5. The emergency landing gear actuator for aircraft as recited in claim 4, further comprising:
    a first check valve between the first branch and the first airbag; and
    a second check valve between the second branch and the second airbag.

6. An emergency landing gear system for aircraft, comprising:
    a wing of an aircraft, first and second adjacent cavities being formed in a lower portion thereof;
    a hydraulic piston mounted within the wing of the aircraft;
    a shock strut having opposed first and second ends, the first end thereof being pivotally secured to the wing of the aircraft;
    at least one wheel rotatably secured to the second end of the shock strut;
    a side strut having opposed first and second ends, the first end thereof being mechanically linked to the hydraulic piston, the second end thereof being pivotally secured to a central portion of the shock strut;
    a first airbag mounted in the first cavity of the wing of the aircraft; and
    a second airbag mounted in the second cavity of the wing of the aircraft,
    whereby selective actuation of the hydraulic piston selectively rotates and extends the side strut, the rotation and extension of the side strut causing the shock strut to rotate about the first end thereof, positioning the at least one wheel in a deployed landing position, the wheel being removably received in the first cavity and the side strut and the shock strut being removably received in the second cavity when in a retracted position, the first airbag and the second airbag each being selectively inflatable for emergency deployment of the at least one wheel, the shock strut and the side strut.

7. The emergency landing gear system for aircraft as recited in claim 6, further comprising a source of pressurized air in fluid communication with the first and second airbags.

8. The emergency landing gear system for aircraft as recited in claim 7, wherein the source of pressurized air comprises an air tank mounted in the wing of the aircraft.

9. The emergency landing gear system for aircraft as recited in claim 8, further comprising a conduit having a first end and a second branched end, the first end being connected to the air tank, a first branch of the second branched end being connected to the first airbag, and a second branch of the second branched end being connected to the second airbag.

10. The emergency landing gear system for aircraft as recited in claim 9, further comprising:
    a first check valve connected between the first branch and the first airbag; and
    a second check valve connected between the second branch and the second airbag.

* * * * *